(12) United States Patent
Wilson et al.

(10) Patent No.: US 10,871,197 B2
(45) Date of Patent: Dec. 22, 2020

(54) BRAKE PAD RETRACTION DEVICE

(71) Applicant: AKEBONO BRAKE INDUSTRY CO., LTD, Tokyo (JP)

(72) Inventors: Kirby Wilson, Lathrup Village, MI (US); Varun Nathani, Farmington Hills, MI (US)

(73) Assignee: AKEBONO BRAKE INDUSTRY CO., LTD, Tokyo (JP)

(\*) Notice: Subject to any disclaimer, the term of this patent is extended or adjusted under 35 U.S.C. 154(b) by 18 days.

(21) Appl. No.: 16/101,886

(22) Filed: Aug. 13, 2018

(65) Prior Publication Data

US 2019/0113090 A1    Apr. 18, 2019

Related U.S. Application Data

(60) Provisional application No. 62/571,919, filed on Oct. 13, 2017.

(51) Int. Cl.
*F16D 65/097*    (2006.01)
*F16D 55/227*    (2006.01)
(Continued)

(52) U.S. Cl.
CPC ......... *F16D 65/0972* (2013.01); *F16D 55/22* (2013.01); *F16D 55/227* (2013.01);
(Continued)

(58) Field of Classification Search
CPC .. F16D 55/227; F16D 55/22; F16D 55/22655; F16D 65/0972; F16D 65/0975;
(Continued)

(56) References Cited

U.S. PATENT DOCUMENTS 3,182,755 A * 5/1965 Campagnolo ......... F16D 55/228
                                                188/72.7
3,318,421 A * 5/1967 De Hoff .................. F16D 65/52
                                                188/106 F
(Continued)

FOREIGN PATENT DOCUMENTS

DE    102017003158 A1    10/2017
EP        2299142 A1     3/2011
(Continued)

*Primary Examiner* — Robert A. Siconolfi
*Assistant Examiner* — San M Aung
(74) *Attorney, Agent, or Firm* — The Dobrusin Law Firm, P.C.

(57) ABSTRACT

A brake assembly comprising: (a) a caliper; (b) two or more brake pads; (c) one or more pins connecting each the two or more brake pads to the caliper; (d) a retraction device connected to one or more of the one or more pins, the retraction devices including: (i) a lock that connects to an end of the pin opposite a caliper; and (ii) a bias device located between the lock and one of the two or more brake pads; wherein during a brake apply each of the two or more brake pads are moved towards the respective retraction device compressing the bias device between the lock and one of the two or more brake pad so that upon release of the brake apply the retraction device applies a retraction force to the one of the two or more brake pads.

20 Claims, 10 Drawing Sheets

(51) Int. Cl.
*F16D 55/22* (2006.01)
*F16D 65/00* (2006.01)
*F16D 55/00* (2006.01)

(52) U.S. Cl.
CPC ...... *F16D 65/0068* (2013.01); *F16D 65/0975* (2013.01); *F16D 2055/007* (2013.01); *F16D 2055/0029* (2013.01)

(58) Field of Classification Search
CPC .... F16D 65/0068; F16D 65/38; F16D 65/567; F16D 2055/007; F16D 2055/0029; F16D 2055/0091; F16D 2125/32; F16D 2065/785; F16D 2121/02; F16D 2123/00
USPC ...... 188/73.38, 73.31, 73.44, 73.45, 1.11 W, 188/71.8, 71.9, 72.3, 72.6, 196 BA, 188/196 D, 196 P, 216, 219.1, 347
See application file for complete search history.

(56) References Cited

U.S. PATENT DOCUMENTS

| | | | |
|---|---|---|---|
| 3,618,714 A | 11/1971 | Croswell | |
| 3,688,876 A | 9/1972 | Hirai et al. | |
| 4,119,180 A | 10/1978 | Horie | |
| 4,364,455 A | 12/1982 | Oshima | |
| 4,392,560 A * | 7/1983 | Nakasu | F16D 55/22655 188/73.34 |
| 4,436,186 A | 3/1984 | Ritsema et al. | |
| 4,491,204 A | 1/1985 | Dirauf et al. | |
| 4,662,483 A * | 5/1987 | Boeck | F16D 55/226 188/72.3 |
| 4,865,161 A | 9/1989 | Schneider et al. | |
| 4,887,696 A | 12/1989 | Redenbarger et al. | |
| 5,161,649 A * | 11/1992 | Carraro | F16D 65/54 188/196 P |
| 5,249,647 A | 10/1993 | Kobayashi et al. | |
| 5,507,369 A * | 4/1996 | Ferreira | F16D 55/227 188/219.1 |
| 5,511,638 A | 4/1996 | Tsuruta | |
| 5,538,103 A | 7/1996 | Rueckert et al. | |
| 6,378,665 B1 | 4/2002 | McCormick et al. | |
| D483,709 S | 12/2003 | Byrd et al. | |
| D489,655 S | 5/2004 | Byrd et al. | |
| 6,920,965 B2 | 7/2005 | Burgdorf et al. | |
| 7,308,974 B2 | 12/2007 | Barbosa et al. | |
| 7,467,693 B2 | 12/2008 | Barbosa et al. | |
| 9,261,152 B2 | 2/2016 | Gutelius et al. | |
| 9,382,957 B2 | 7/2016 | Knorr-Bremse | |
| 9,551,390 B2 | 1/2017 | Eichler et al. | |
| 9,599,176 B2 | 3/2017 | Baumgartner et al. | |
| 2002/0189911 A1 | 12/2002 | Layton et al. | |
| 2010/0000828 A1 | 1/2010 | Pericevic et al. | |
| 2012/0186917 A1 | 7/2012 | Gutelius | |
| 2013/0087416 A1 * | 4/2013 | Kobelt | F16D 65/183 188/72.3 |
| 2014/0339026 A1 | 11/2014 | Gutelius et al. | |
| 2017/0097057 A1 | 4/2017 | Burgoon | |

FOREIGN PATENT DOCUMENTS

| | | |
|---|---|---|
| EP | 2935928 B1 | 2/2017 |
| GB | 2172068 A | 9/1986 |
| JP | 08-284983 | 1/1966 |
| JP | 56-127830 | 10/1981 |
| JP | 08-261261 | 8/1996 |
| JP | 2001-336554 | 12/2001 |
| JP | 56-21633 | 10/2014 |

* cited by examiner

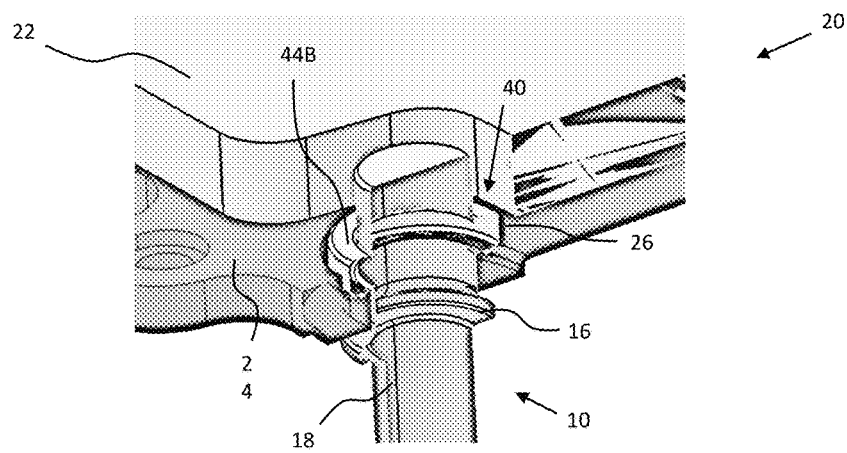
FIG. 14
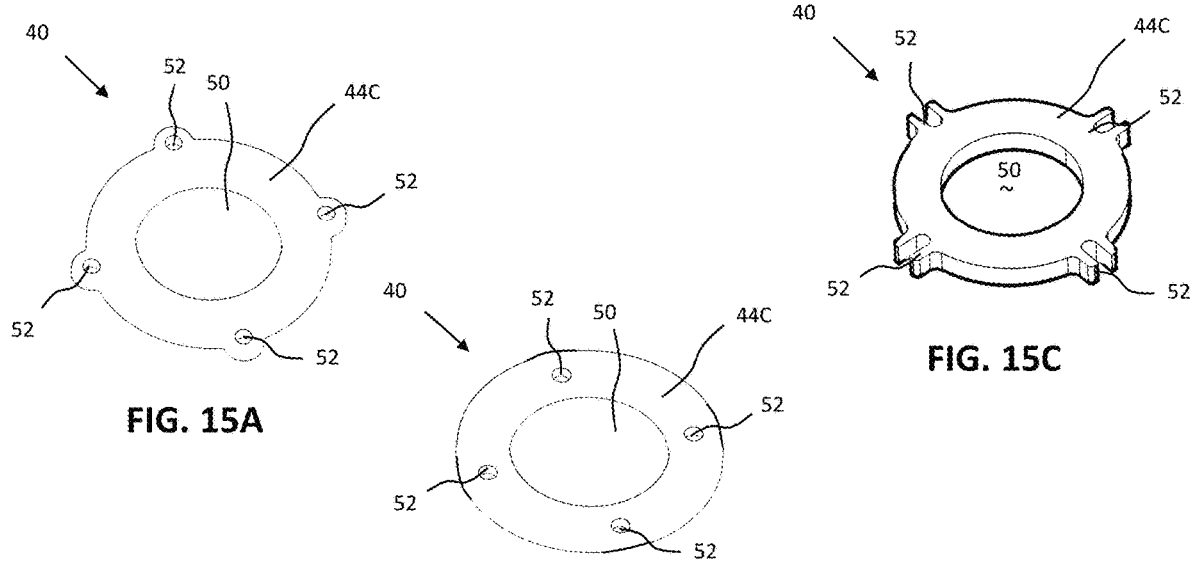
FIG. 15A  FIG. 15B  FIG. 15C

US 10,871,197 B2

BRAKE PAD RETRACTION DEVICE

FIELD

The present teachings relate to a retraction device that axially retracts a brake pad and more particularly axially moves along an abutment pin of a brake pad to axially move the brake pad once a brake apply is complete.

BACKGROUND

The present teachings are predicated upon providing an improved retraction device that assists in moving brake pads out of contact with a rotor once a brake apply is complete. Many attempts have been made provide retraction devices that assist in retracting a brake pad after a braking event. However, most of these devices apply a retract force to a top of a brake pad which may move the top of the brake pad, but the bottom of the brake pad may remain in contact with or close to a rotor. Other attempts have been made to retract the brake pads by pushing on an ear or an abutment surface of a brake pad, however, not all brake pads include an ear or abutment surface.

Examples of braking systems and associated brake pads are disclosed in U.S. Pat. Nos. 4,865,161; 5,538,103; 6,920,965; 7,467,693; and 9,599,176 all of which are expressly incorporated herein by reference for all purposes. What is needed is a retraction device that is connected to a pin. What is needed is a retraction device that is mounted on an abutment pin and axially moves along the abutment pin to move a brake pad away from a rotor. It would be attractive to have a retraction device that applies an axial force to a pressure plate of brake pad.

SUMMARY

The present teachings include: a brake assembly comprising: (a) a caliper; (b) two or more brake pads; (c) one or more pins connecting each the two or more brake pads to the caliper; (d) a retraction device connected to one or more of the one or more pins, the retraction devices including: (i) a lock that connects to an end of the pin opposite a caliper; and (ii) a bias device located between the lock and one of the two or more brake pads; wherein during a brake apply each of the two or more brake pads are moved towards the respective retraction device compressing the bias device between the lock and one of the two or more brake pad so that upon release of the brake apply the retraction device applies a retraction force to the one of the two or more brake pads.

The present teachings provide a retraction device that is connected to a pin. The present teachings provide a retraction device that is mounted on an abutment pin and axially moves along the abutment pin to move a brake pad away from a rotor. The present teachings provide a retraction device that applies an axial force to a pressure plate of brake pad.

BRIEF DESCRIPTION OF THE DRAWINGS

FIG. 14 is cross-section C-C of the pin and retraction device of FIG. 13;
FIG. 15A is a perspective view of a retraction device;
FIG. 15B is a perspective view of a retraction device;
FIG. 15C is a perspective view of a retraction device.

DETAILED DESCRIPTION

Figure 1:
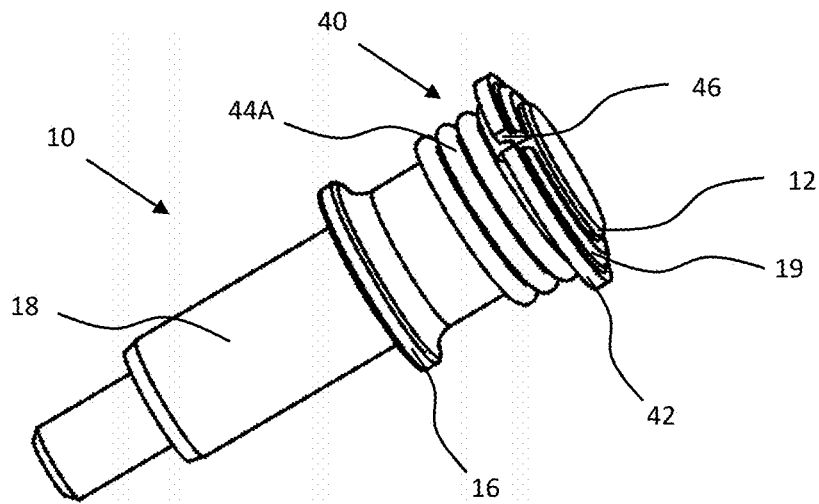
FIG. 1 is a perspective view of a pin and retraction device of a brake assembly.

The explanations and illustrations presented herein are intended to acquaint others skilled in the art with the invention, its principles, and its practical application. Those skilled in the art may adapt and apply the invention in its numerous forms, as may be best suited to the requirements of a particular use. Accordingly, the specific embodiments of the present invention as set forth are not intended as being exhaustive or limiting of the teachings. The scope of the teachings should, therefore, be determined not with reference to the above description, but should instead be determined with reference to the appended claims, along with the full scope of equivalents to which such claims are entitled. The disclosures of all articles and references, including patent applications and publications, are incorporated by reference for all purposes. Other combinations are also possible as will be gleaned from the following claims, which are also hereby incorporated by reference into this written description.

The brake assembly functions to create a braking force. The brake assembly may slow or stop a vehicle upon movement of one or more and preferably two or more brake pads into contact with a rotor. The brake assembly may include a caliper, a support bracket, a rotor, two or more brake pads, or a combination thereof. The brake assembly may include one or more pistons that axially move out of a piston bore in the caliper. The brake assembly may include hydraulic fluid that moves the pistons, a motor that moves the pistons, or both. The brake assembly may provide service braking functions, parking brake functions, or both. The brake assembly may be located within a gas vehicle, diesel vehicle, electric vehicle, or a combination thereof. The brake assembly may be a sliding caliper system (i.e., the one or more pistons may axially move the caliper so that a second side of the caliper moves a brake pad into contact with a rotor. The brake assembly may be a fixed caliper or an opposed caliper such that opposing pistons move towards each other to create a braking force. The caliper may include one or more pistons, two or more pistons, three or more pistons, or even four or more pistons (e.g., 5, 6, 7, 8, 9, or even 10 pistons).

The caliper may function to assist in creating a brake apply. The caliper may be a floating caliper, a fixed caliper or both. The caliper may be used with or without a support bracket. The caliper may include one or more pistons, two or more pistons, one or more opposing pistons, two or more opposing pistons, four or more opposing pistons, or a combination thereof. The caliper may include a piston on one side and one or more fingers on an opposing side and during a brake apply the piston may extend out of a piston bore into contact with a brake pad moving the brake pad into contact with a first side of a rotor and the fingers may be moved into contact with an opposing brake pad and the opposing brake pad moved into contact with a second side of the rotor. In another example, two opposing pistons may simultaneously move towards each other and into contact with brake pads and then opposing sides of a rotor so that a brake apply is formed. During non-braking conditions the one or more pistons may be free of contact with the brake pad, may be connected to the brake pads through one or more clips, may be in contact with a brake pad but may be disconnected from the brake pads, or a combination thereof. During braking conditions the brake pads move axially along the pins, substantially parallel to the sides (e.g., abutment) of the caliper, or both and into contact with a rotor.

The rotor may be any rotor that assists in producing a brake force during contact with one or more brake pads. The rotor may be generally circular and have an axis of rotation that the rotor rotates around. The rotor may be connected to a wheel hub and slowing or stopping the rotor may slow or stop the wheel hub so that a vehicle is slowed or stopped.

The support bracket may be any device that connects the brake system to the vehicle, a knuckle, or both; supports that brake pads in the brake system; supports an end of the brake pads, extends along rotor; extends around two or more sides of the brake pads; or a combination thereof. The support bracket may have two sides (i.e., abutments) that the brake pad extends between. The support bracket may support one or more pins (e.g., abutment pins). The support bracket may have one abutment and one abutment pin. The brake pads in a neutral position may be free of contact with either side (e.g., abutment) of the support bracket but may be located proximate to the sides so that during a brake apply if a pin deflects, fails, or both the brake pads will contact the sides and be prevented from moving due to the contact with the sides of the support bracket. The caliper may be free of a support bracket and the caliper may act as a support bracket. The support bracket may be connected to a caliper via one or more pins and preferably two pins.

The one more pins may extend from and/or through a caliper housing, a support bracket, or both so that one or more brake pads are suspended on, rest upon, or both each of the one or more pins. The one or more pins may extend partially and/or fully from and/or through the caliper, the support bracket, or both and the brake pads may be suspended and hang below the pins, rest upon and be located above the pins, or both. The pins may be any shape and size so that during a brake apply a rotational force on the brake pads is transferred to the pins. The pins may have sufficient strength to prevent movement of the brake pads, deflection of the pins, or both. The pins may be round, oval, square, a polygon, a triangle, a complementary shape to the pin hole and/or dampening chamfer, or a combination thereof. Preferably, the pins are circular and extend into and/or through the support bracket. The pins may be abutment pins. The pins may carry and entire load of the brake pads during a brake apply. The pins may carry the rotational load such that the brake pads may be free of contact with the caliper, a support bracket, or both during a braking event. The brake pads may be carried on a pin in the leading end, the trailing end, or both of a brake assembly. The brake pads may only be carried on a brake pin in the trailing end or the leading end. The brake pads may be carried on a pin on one end and an abutment of the caliper or support bracket on an opposing end. The brake pads may hang from the pins (e.g., the pins may be located on a top of the brake pads). The brake pads may rest on the pins (e.g., the pins may be located on a bottom of the brake pads). The brake pads may be supported by a combination of the pins and abutments. The pins may include a taper at an end.

The taper may function to allow a lock to be press fit onto the pin. The taper may assist the pin in extending into an aperture in the caliper, the brake pad, or both. The taper may be a leading end (e.g., an end of a pin that extends into an aperture). The taper may receive one or more fasteners. The taper may assist in connecting the pin to the brake pad, the caliper, or both. The one or more pins may include one or more retention features.

The one or more retention features may function to create a connection with a lock. The one or more retention features may prevent a lock from being removed form a pin. The one or more retention features may be located within the lock, the pin, or both. The one or more retention features may be a male piece, a female piece, or both. The one or more retention features may be recess in the lock, the pin, or both. The one or more retention features may be projection that extends out of the pin into the lock or out of the lock into the pin. The one or more retention features may be biased into a recess in the lock or into the pin so that the lock may be moved over the pin. The one or more retention features may be a recess in the lock and a recess in the pin and a projection that extends from the recess in the pin into the recess in the lock or above the lock to prevent the lock from axially extending off of the pin. The pin, the lock or both may include one or more retention features. When more than one retention feature is present, the retention features may be located 90 degrees or more apart, 135 degrees or more apart, or about 180 degrees apart. The lock may be free of a retention feature. A step, edge, top, or a combination thereof may act as a retention feature. The pin may include a lock at a first end and a fastener at a second end. The one or more fasteners may connect the pins to a caliper, a brake pad, or both. The one or more fasteners may connect to a leading end of a pin. Each pin may include one or more fasteners. Each pin may include a plurality of fasteners. Preferably, each pin includes a single fastener. The one or more fasteners may be threaded, press fit, or both. The one or more fasteners may prevent the pin from axially moving out of an aperture. The one or more fasteners may create a shoulder to resist an axial force. The one or more fasteners may be a nut, a threading on the pin, or both. The one or more fasteners may prevent the pin from rotating or moving relative to a longitudinal axis of a pin during a braking event so that the pin remains substantially aligned with its axis. The fastener may act as a boss on an end of a pin that is inserted into an aperture.

The one or more bosses function to prevent rotation of the pin relative to the caliper. The one or more bosses function to prevent movement of the pin out of its longitudinal axis during a braking event. The one or more bosses may assist a cantilever pin in remaining static. The one or more bosses may increase an outer diameter of the pin so that the pin cannot be axially moved relative to the caliper. The bosses may prevent the pin from being pulled through an aperture. The bosses may rest on a shoulder of the caliper.

The one or more attachment pieces may function to connect the pin, the retraction device, of both to a caliper. The one or more attachment pieces may extend into the caliper, remain within the caliper, or both. The one or more attachment pieces may form a cantilever connection with the caliper. The one or more attachment pieces may support the retraction device, the brake pad, or both during a braking event. The attachment piece may be about 25 percent or more of a length of the pin, about 30 percent or more, about 40 percent or more, or about 50 percent or more of a total length of the pin. The attachment piece may be located within the caliper and the pin may extend from the caliper and through an aperture in a brake pad.

The teachings herein provide a brake pad. The brake pad may function to create a braking force. The brake pad may include one or more apertures for connecting the brake pad to a brake system. Preferably, the brake pad may include one or more apertures so that pins may extend through the brake pad. Preferably, each brake pad includes at least a pressure plate and friction material and the pressure plate includes one or more apertures.

The friction material may be any friction material that assists in creating a braking force. The friction material may be asbestos free, copper free, or both. The friction material may include basalt fibers. The friction material may be compressed materials that are connected to a pressure plate. The friction material may be applied to the pressure plate using any method and/or material. The connection between the friction material and the pressure plate may be mechanical connection (e.g., a rivet, a projection, a bolt, a fastener, peened, the like, or a combination thereof), a chemical connection (e.g., adhesive, epoxy, bonding agent, the like, or a combination thereof), or a combination of both.

The pressure plate may function to connect to a friction material so that a braking force may be created. The pressure plate may provide support for the friction material, provide a point of contact with other brake components, a point for moving the brake pad to create a brake apply, or a combination thereof. The pressure plate may be made of any material so that the pressure plate provides support to friction material, assists in producing a friction force during braking, or both. The pressure plate may include one or more apertures that connect the pressure plate to a pin. The pressure plate may connect the brake pad to a caliper via one or more pins. Preferably, the pressure plate is connected to the caliper via two or more pins. The pressure plate may be made of metal, a formable material, a stampable material, a composite material, a material with sufficient rigidity to provide support to a friction material during a braking event, or a combination thereof. The pressure plate may include one or more apertures so that the pressure plate may be included in a brake system. The pressure plate may include one or more, two or more, three or more, or even four or more apertures. The pressure plate may include apertures on the top, bottom, trailing end, leading end, or a combination thereof.

The one or more apertures may function to connect the brake pad into a brake system, to one or more pins, or both so that the brake pad may be used to create a brake apply. The apertures may be one or more holes for connecting the pressure plate to a brake system, a pin, or both; one or more pin holes in a pressure plate; or a combination thereof. The apertures may be located at any location on the pressure plate so that the brake pad creates a friction force, the pressure plate does not contact an abutment, the pressure plate slides along one or more pins, or a combination thereof. The apertures may be located in a top half, a bottom half, a top, a bottom, a trialing end, a leading end, or a combination thereof. Preferably, the apertures are two pin holes. More preferably, the two pin holes are located on a bottom portion of the pressure plate, a lower portion of the pressure plate, a lower half of a pressure plate, or both. The two or more pin holes may be located in opposite ends of the brake pad. For example, one pin hole may be located in a leading position and the other pin hole may be located in a trailing position (i.e., a point on a rotor, during rotation of the rotor, will pass proximate to the leading position and then pass by the trailing position). The one or more pin holes may have any shape so that during a non-braking condition the pin holes do not create rattle; do not create a sound that is audible by a user, an occupant, or both; movement of the brake pad is controlled, movement of the brake pad is in two or more directions; or a combination thereof. The brake pad may be connected to one or more shims.

The one or more shims may function to prevent noise, vibration, and harshness when a piston creates a brake apply. The one or more shims may contact the retraction device. The one or more shims may be free of contact with the retraction device. The one or more shims may be made of stainless steel, aluminum, or both. The one or more shims may be part of the brake assembly and be located between the brake pad and the piston.

The brake assembly may include one or more retraction devices. The retraction devices function to move the one or more brake pads to create clearance, air gap between the brake pad and a rotor, or both. The retraction devices may only move a single brake pad. The one or more retraction devices may control a size of an air gap, clearance, or both. The one or more retraction devices may be connected to, locked on, in communication with, or a combination thereof one or more pins. A single retraction device may move a brake pad. The retraction devices may be located in a trailing end, a leading end, a top, a bottom, or a combination thereof of a brake pad. The brake assembly may include a plurality of retraction devices. The retraction devices may move along a pin and preferably move axially along an abutment pin. The retraction device may be concentric with a pin. The one or more retraction devices may be located entirely on a side of the pressure plate as the friction material. The one or more retraction devices may be located proximate to an end of the pin. The one or more retraction devices may be coplanar with the friction material. The one or more retraction devices may be free of any arm, pieces, or parts that extend from a first side of the pressure plate to a second side of the pressure plate. The pressure plate may act as a second side of the retraction device. The retraction device may include a lock, a bias device, a lock adjuster, or a combination thereof. The one or more locks may lock the retraction device onto a pin. The one or more locks may connect a bias device to a pin, form an abutment for the bias device to press against, lock a bias device adjacent a pressure plate of a brake pad, or a combination thereof. The one or more locks may remain axially static. The one or more locks may be connected to the pin by being press fit onto the pin, by a retention feature in the lock, a retention feature in the pin, or a combination thereof. The one or more locks may axially move. The one or more locks may axially move as the friction material wears. The one or more locks may extend around a circumference of a pin one or more times. The one or more locks may extend into a recess within a pin. The one or more locks may be located entirely on a side of the pressure plate as the friction material. The one or more locks may be located proximate to an end of the pin. The one or more locks may be coplanar with the friction material. The one or more locks, bias devices, or both may be coaxial with the pins. The one or more locks may connect to an external surface of a pin and the surface may be cylindrical, square, rectangular, diamond, circular, octagonal, or a combination thereof. The one or more locks may fixedly connect to the pins. Each pin may include one lock. Each pin may include two or more locks. The one or more locks may slip to adjust to maintain a constant gap as the brake pad wears. The one or more locks may include one or more lock adjusters, one or more steps, or both.

The one or more steps may function to receive one or more retention features, prevent axial movement of the lock, the spring, or both. The one or more steps may be located on a side of the stop opposite the bias device. The one or more steps may be in contact with a retention feature. The one or more steps may function to allow a retention feature to be depressed so that the lock may be moved, removed, or both. The one or more steps may create a tapered portion on the lock. The one or more steps may include one or more features that receive a retention feature so that the lock is restricted from rotating relative to the pin. The one or more steps may each include one or more lock adjusters. Preferably, a single lock adjuster extends through the one or more steps.

The lock adjusters function to allow the locks to adjust with wear of the brake pads. The lock adjusters may permit the locks to flex. The lock adjusters may allow the lock to increase or decrease in size. The lock adjusters may allow the lock to slide as an amount of force exerted upon the lock by the bias device increases. The lock adjusters may be a split in the lock, a gap in the lock, or both. The lock adjusters may allow the lock to expand and contract. The lock adjusters may permit the lock to be press fit onto the pin. The lock adjusters may hold the lock onto pins once the lock is moved onto the pin. The lock may be free of a lock adjuster. The lock and lock adjusters may prevent hold the bias device onto the pin and create a ground for the bias device to push against.

The bias device may function axially move a brake pad. The bias device may be compressed during a brake apply. The bias device may uncompressed to release energy when braking is complete and a brake is released. The bias device may store energy. The bias device may release energy. The bias device may be free of any retraction arms. The bias device may be free of any loops that store energy, release energy, or both. The bias device may be free of any parts that extend from a first side of the pressure plate to a second side of the pressure plate. The bias device may be made of plastic, an elastomer, metal, or a combination thereof. The bias device may be a rubber washer. The bias device may move the brake pad, pressure plate, or both along a pin. The bias device may be connected to a pressure plate. Preferably, the bias device is free of a connection with a pressure plate. The bias device may extend into a recess in a pressure plate. The pressure plate may include a shoulder around an aperture in the pressure plate and the bias device may extend into the shoulder. The bias device may be connected to the lock. The bias device may move independent of both the pressure plate and the lock. A length of the bias device may determine a running clearance between the brake pad and a rotor. A distance between the lock and the pressure plate may determine the running clearance between the rotor and the brake pad. A material composition of the bias device may determine a distance the brake pad is retracted, a shape of the bias device, a retraction force, or a combination thereof. The bias device may be a spring, a grommet, bushing, or a combination thereof.

The bias device may be a spring. Preferably, the spring is a conical spring. The spring may include two or more helical wraps, three or more helical wraps, three or more helical wraps, or four or more helical wraps. The bias device may impart an axial force. The bias device may wrap around the pin. The spring may be free of any parts that extend away from the pin, from a first side of a brake pad to a second side of a brake pad, or both. The spring may be concentric with a pin. The spring may be free of any extensions that extend away from the pin. The spring may be a wire that helically wrapped around the pin. The spring may be constrained between a boss and a lock so that the spring is movable with a brake pad. The brake pad and spring may move along a pin during braking and retraction of the brake pad. The spring and brake pad may be located between the boss and a lock. Preferably, the brake pad is located proximate to the boss and the spring is located proximate to the lock. The spring may be located on the friction material side of the pressure plate. The spring may be made of steel, stainless steel, spring steel, or a combination thereof. The bias device may include both a spring and a grommet, bushing, or both or may be free of a spring.

The grommet may function to move the brake pad axially along one or more pins, maintain the brake pad in a plane during movement, prevent tipping, or a combination thereof. The grommet may be connected to the pin. The grommet and pin may be concentric. The grommet and brake pad may be constrained by one or more bosses on the pin. The grommet may be free of a constraint that retains the grommet on the pin. For example, the pin may include a boss only on one side of the grommet. The grommet may be friction fit on the pin. The grommet may elastically deform during a brake apply. The grommet may store energy during a brake apply. The grommet may release energy once a brake apply is complete. The grommet may stretch during a brake apply and the portion of the grommet in contact with the pin may maintain contact with the pin during the brake apply. The grommet may stretch during a brake apply and then once a brake apply is complete the grommet may move towards a neutral state where the grommet is no longer stretched and the brake pad is moved away from a rotor, an air gap is formed, or both. The grommet may move along the pin during a brake apply so that the grommet compensates for wear of the friction material. For example, the grommet may elastically deform until the grommet can no longer deform and then the grommet may move along the pin to compensate for pad wear. The grommet may be made of plastic, an elastomer, rubber, a natural rubber, a synthetic rubber, ethylene propylene diene, nitrile rubber, styrene butadiene rubber, silicone rubber, butyl rubber, polybutadiene, a polymer, polyisoprene (natural or synthetic), a halogenated butyl rubber, fluroelastomer, perfluroelastomer, polyether block amides, chlorosulfonated polyethylene, ethylene-vinyl acetate, ethylene acrylic elastomer, ethylene methyl acrylate copolymer, a thermoplastic elastomer, elastin, polysulfie rubber, elastolefin, or a combination thereof. The grommet may elastically deform about 0.5 mm or more, about 1 mm or more, or even about 2 mm or more. The grommet may elastically deform about 5 mm or less or about 3 mm or less. The grommet may be circular, square, cylindrical, a cube, oval, or a combination thereof. The grommet may have a thickness of about 1 mm or more, about 1.5 mm or more, or about 2 mm or more. The grommet may have a thickness of about 5 mm or less, about 4 mm or less, about 3 mm or less, or about 2.5 mm or less. The thickness of the grommet may be sufficiently large to create a force of about 5 N or more, about 10 N or more, about 15 N or more, or even about 20 N or more on a brake pad. The thickness of the grommet may be selected to create a force of about 100 N or less or about 50 N or less. During a brake apply the grommet may compress (e.g., the thickness may be reduced) during a brake apply so that the grommet stores energy. The grommets may include one or more anti-rotation features that may prevent rotation of the grommet about the pin.

The one or more anti-rotation features function to maintain alignment of the grommet and pin, prevents rotational movement of the grommet relative to a pin, or both. The one or more anti-rotation features may provide localized contact regions, regions with a localized increase in force when compared to a region without the anti-rotation features, or both. The one or more anti-rotation features may extend axially from a surface of the grommet. The one or more anti-rotation features may have a dome shape, square shape, rectangular shape, oval shape, triangular shape, pyramid shape, or a combination thereof. The one or more anti-rotation features may be symmetrically located about a surface of the grommet. The one or more anti-rotation features may be asymmetrically located about a surface of the grommet. The one or more anti-rotation features may be only on a surface of the grommet that faces a brake pad, may only be on a surface of the grommet that opposes the brake pad, or may be on a surface that faces the brake pad and a surface that opposed the brake pad. The grommet may include one or more, two or more, three or more, four or more, five or more, six or more, or even seven or more anti-rotation features. The grommet may include an equal amount of anti-rotation features on opposing sides. The grommet may include a different amount of anti-rotation features on opposing sides. The anti-rotation features may be equally spaced apart. The anti-rotation features may have unequal spacing therebetween. The anti-rotation features may be spaced about 60 degrees or more apart, about 90 degrees or more apart or about 120 degrees or more apart. The anti-rotation features may be spaced about 180 degrees or less apart. The anti-rotation features may be located between an outer periphery (e.g., circumference) and an inner periphery (e.g., a circumference defined by an opening that receives the pin).

The opening may function to receive the pin. The bias device may include one or more openings. Preferably, the bias device includes a single opening. The opening may be located in bias device when the bias device is configured as a spring, grommet, bushing, or a combination thereof. The opening may receive the pin and may connect the bias device to the pin. The opening may create friction fit with the pin. The opening may be larger than the pin so that the bias device and the pin are substantially free of contact. The opening may assist in creating a retraction force. The opening and the pin may be concentric. The opening may be round, oval, square, rectangular, triangular, a star, or a combination thereof. The shape of the opening may be varied to add or subtract an amount of contact between the pin and the bias device. For example, if the opening is square the bias device may contact the pin at four locations and have four alternating location where the bias device is free of contact with the pin. The opening may have a diameter that is substantially the same size as a diameter of the pin. The opening may have a diameter that is smaller than the diameter of the pin so that the bias device elastically deforms to create a connection with the pin. The opening may be a singular part that retains the bias device within the brake system (e.g., grommet). The opening may assist in connecting the bias device within the system but the bias device may include addition connection points or mounting points (e.g., a bushing).

The bushing may function to move the brake pad axially along one or more pins, maintain the brake pad in a plane during movement, prevent tipping, or a combination thereof. The bushing may be connected to the pin. Preferably, the bushing is in communication with the pin and is connected to the brake pad. More preferably, the bushing is connected to a pressure plate of the brake pad. The bushing and pin may be concentric. The bushing and brake pad may be constrained by one or more bosses on the pin. The bushing may be free of a constraint that retains the bushing on the pin. For example, the pin may include a boss only on one side of the bushing or the bushing may be attached to the pressure plate and in contact with but free of a connection with the pin. The bushing may be friction fit on the pin. The bushing may elastically deform during a brake apply. The bushing may store energy during a brake apply. The bushing may release energy once a brake apply is complete. The bushing may stretch during a brake apply and the portion of the bushing in contact with the pin may maintain contact with the pin during the brake apply. The bushing may stretch during a brake apply and then once a brake apply is complete the bushing may move towards a neutral state where the bushing is no longer stretched and the brake pad is moved away from a rotor, an air gap is formed, or both. The bushing may move along the pin during a brake apply so that the bushing compensates for wear of the friction material. For example, the bushing may elastically deform until the bushing can no longer deform and then the bushing may move along the pin to compensate for pad wear. The bushing may be connected to the brake pad and as the brake pad moves, a portion of the bushing moves and deforms, and upon a brake release, the bushing may release energy and pull or push the brake pad towards a neutral state creating an air gap. The bushing may be made of plastic, an elastomer, rubber, a natural rubber, a synthetic rubber, ethylene propylene diene, nitrile rubber, styrene butadiene rubber, silicone rubber, butyl rubber, polybutadiene, a polymer, polyisoprene (natural or synthetic), a halogenated butyl rubber, fluroelastomer, perfluroelastomer, polyether block amides, chlorosulfonated polyethylene, ethylene-vinyl acetate, ethylene acrylic elastomer, ethylene methyl acrylate copolymer, a thermoplastic elastomer, elastin, polysulfie rubber, elastolefin, or a combination thereof. The bushing may elastically deform about 0.5 mm or more, about 1 mm or more, or even about 2 mm or more. The bushing may elastically deform about 5 mm or less or about 3 mm or less. The bushing may be circular, square, cylindrical, a cube, oval, or a combination thereof. The bushing may have a thickness of about 1 mm or more, about 1.5 mm or more, or about 2 mm or more. The bushing may have a thickness of about 5 mm or less, about 4 mm or less, about 3 mm or less, or about 2.5 mm or less. The thickness of the bushing may be sufficiently large to create a force of about 5 N or more, about 10 N or more, about 15 N or more, or even about 20 N or more on a brake pad. The thickness of the bushing may be selected to create a force of about 100 N or less or about 50 N or less. During a brake apply the bushing may compress (e.g., the thickness may be reduced) during a brake apply so that the bushing stores energy. The bushing may include one or more mounting portions that connect the bushing to the brake pad and preferably a pressure plate of a brake pad.

The one or more mounting points function to create a connection between the bushing and the brake pad or to receive one or more bushing mounts that connect the bushing to the brake pad. The one or more mounting points may be a recess, a hole, aperture, gap, space, or a combination thereof. The one or more mounting points may be located within a body of the bushing. The one or more mounting points may be an ear that extend outward from the body of the bushing. The one or more mounting points may be a closed geometric shape (e.g., circular, oval, square). The one or more mounting points may be open or include an opening. The mounting points may be "U" shaped. The bushing may include 1 or more, 2 or more, 3 or more, 4 or more, or even 5 or more mounting points. The bushing may include a plurality of mounting points. The mounting points may be symmetrically located about the bushing. The mounting points may be asymmetrically located about the bushing. The mounting points may be spaced about 60 degrees or more apart, about 90 degrees or more apart or about 120 degrees or more apart. The mounting points may be spaced about 180 degrees or less apart. The shape, size, location, or a combination thereof of the mounting points may affect the amount of force the bushing generates. For example, if the mounting point is a closed structure, the more material between the bushing mount and an outer perimeter (e.g., diameter) may increase an amount of force generated. Locating the mounting points internal of a body may provide an increase in force when compared to a mounting point that is located within an ear or external to the body. Externally locating a mounting point may generate a force of about 10 N or less, 7 N or less, or about 5 N or less than internally locating the mounting points. Internally locating a mounting point may generate a force of about 1 N or more or about 3 N or more than Externally locating a mounting point. For example, if there are 4 mounting points and each one generates 3 additional Newtons by being internally located this would generate 12 N of additional force when compared to an externally located mounting point. Each of the mounting points may receive one or more bushing mounts.

The one or more bushing mounts function to connect the bushing to a brake pad and preferably a pressure plate. The bushing mounts may be a fastener, rivet, nail, screw, peen, weld, stud, or a combination thereof. The bushing mounts may be part of the brake pad. The bushing mounts may extend through the mounting points and connect to the brake pad. The bushing mounts may have a head. The bushing mounts may prevent axial movement of the bushing. The bushing mounts may allow some axial movement of the bushing along the bushing mounts. The bushing mounts may create a substantially fixed connection between the bushing and the brake pad an any movement of the bushing axially may be from movement of the brake pad axially and the bushing being deflected due to friction forces between the bushing and the pin. The bushing mounts may reinforce the mounting point so that the mounting points are not damaged during movement of the brake pad.

Figure 2:
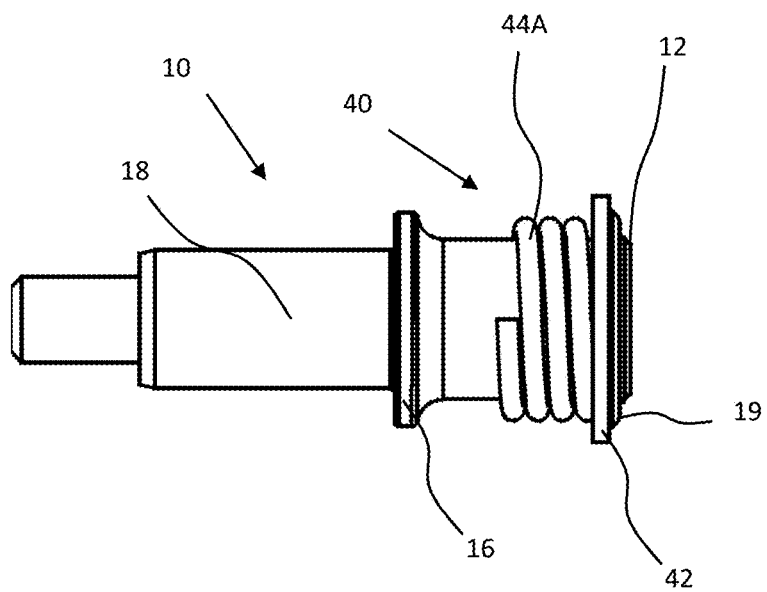
FIG. 2 is a side view of a pin and retraction device of a brake assembly.
Figure 6:
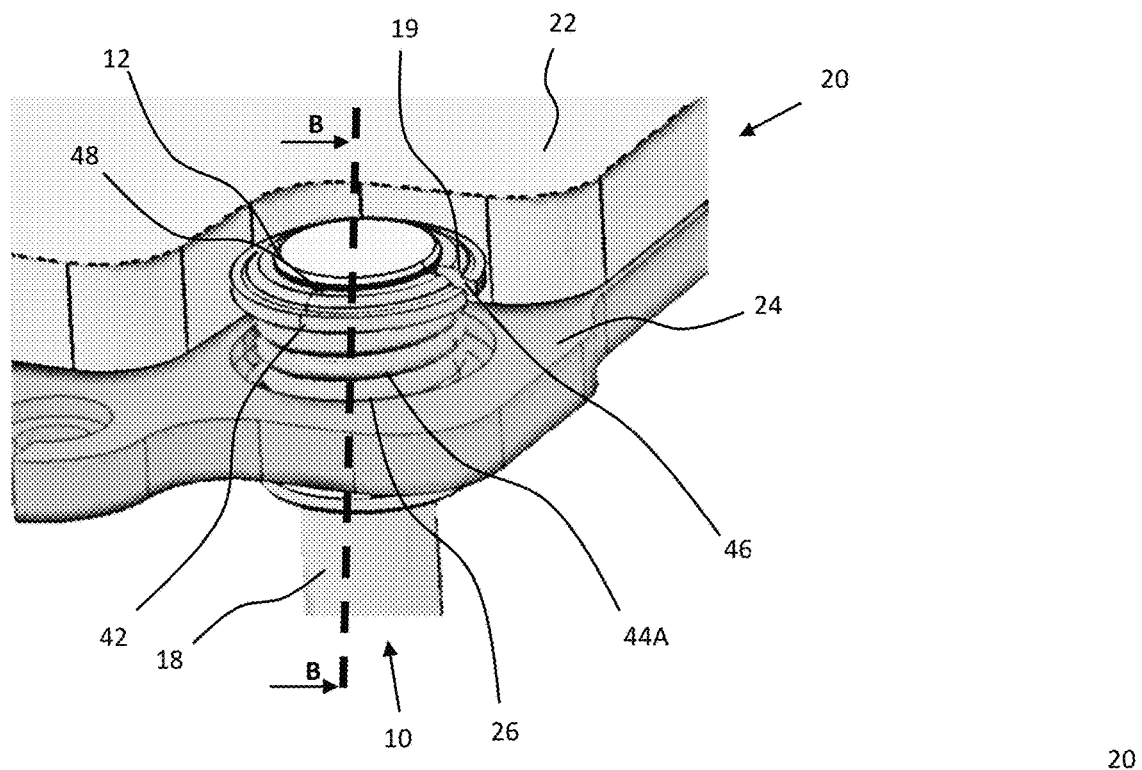
FIG. 6 is a close-up view of a retraction device and pin located within an aperture of a brake pad.

FIGS. 1 and 2 illustrate a pin 10 and retraction device 40 of a brake assembly (not shown). The pin 10 includes an attachment piece 18 abutting a boss 16, the attachment piece 18 configured to be inserted into an aperture of the brake assembly. A retraction device 40 is inserted over a taper 12 of the pin 10. The retraction device 40 includes a bias device 44 that is a spring 44A having a step 19 and a lock 42. The lock 42 further includes a lock adjuster 46 to adjust an opening of the lock 42, the position of the lock 42, or to assist in connecting the lock 42 to the pin 10. The lock is retained in position relative to the spring 44A, the pin 10, or both by a retention feature (as shown in FIG. 6).

Figure 3:
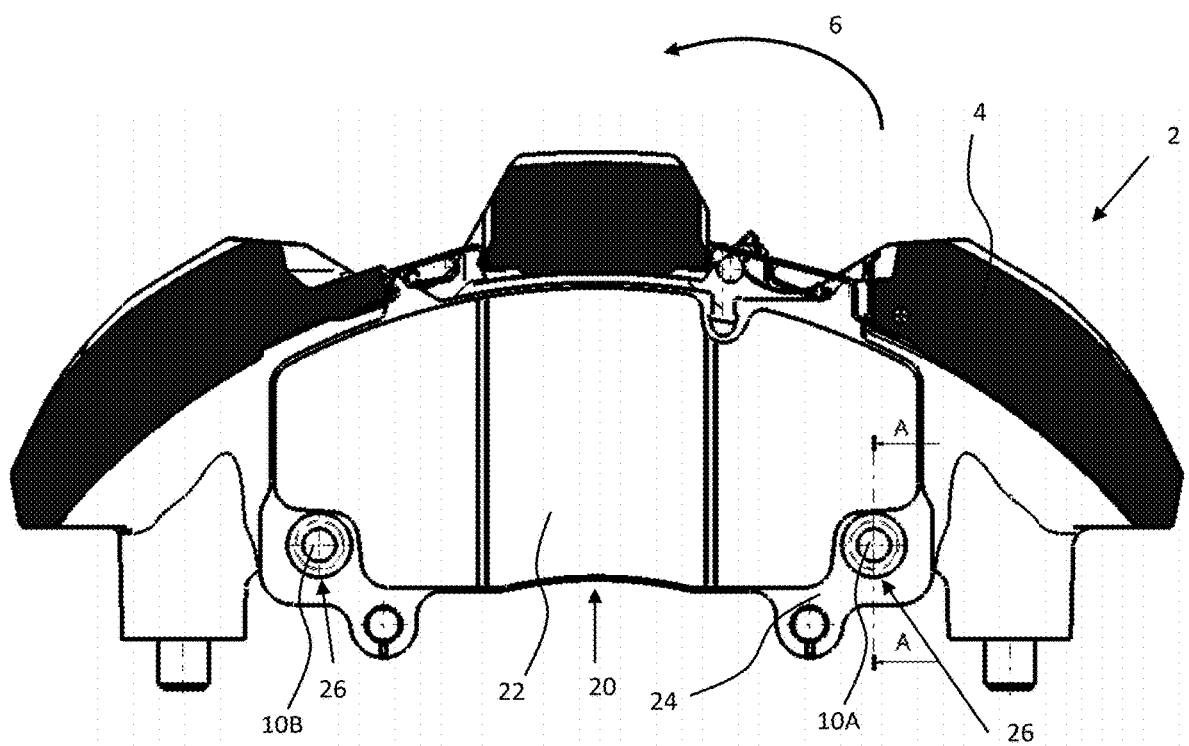
FIG. 3 is a side view of half of a brake assembly.

FIG. 3 illustrates a front view of half of a brake assembly 2. The brake assembly 2 includes a caliper 4 and a brake pad 20. The brake pad 20 further includes a friction material 22 disposed on a surface of a pressure plate 24. The brake assembly 2 includes a pin 10 in the leading end 10A and a trailing end 10B that are inserted into a plurality of apertures 26 located on the pressure plate 24. The pins 10 are configured to position the brake pad 20 so that the friction material 22 engages or disengages a surface of a rotor (not shown) moving in a direction of rotation 6. The pins 10 position the brake pad 20 in a direction substantially perpendicular to the direction of rotation 6 and create an abutment during a braking event.

Figure 4:
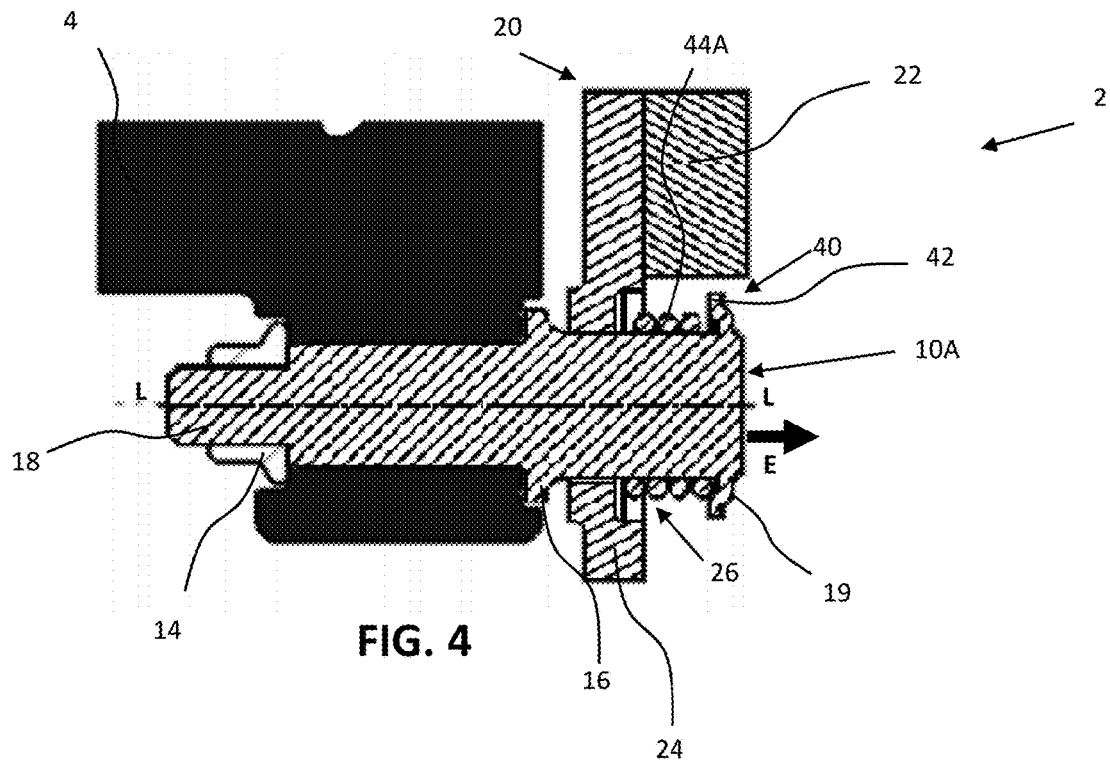
FIG. 4 is cross-section A-A of the retraction device in the brake assembly of FIG. 3.

FIG. 4 illustrates cross-section A-A of the brake assembly 2 of FIG. 3. The brake assembly 2 includes a caliper 4 and a brake pad 20. The brake pad 20 further includes a friction material 22 disposed on a surface of a pressure plate 24. An attachment piece 18 of a pin 10 is inserted into an aperture 26 of the pressure plate 24 so that a boss 16 of the pin 10 abuts a surface of the caliper 4. A retraction device 40 is inserted over a taper (see FIGS. 1 and 2) of the pin 10. The retraction device 40 includes a bias device 44 that is a spring 44A having a step 19 and a lock 42. The lock 42 further includes a lock adjuster 46 to adjust an opening of the lock 42, the position of the lock 42, or to assist in connecting the lock 42 to the pin 10. The lock is retained in position relative to the spring 44A, the pin 10, or both by a retention feature (as shown in FIG. 6). A nut 14 is secured to an end of the pin 10. The retraction device 40 is configured to bias the brake pad 20 in a position along a longitudinal axis (L) of the pin 10 when the brake pad 20 is disengaged from a surface of a rotor (not shown). When the brake pad 20 engages the rotor, the brake pad 20 is moved in an engaging direction (E), compressing the spring 44A.

Figure 5:
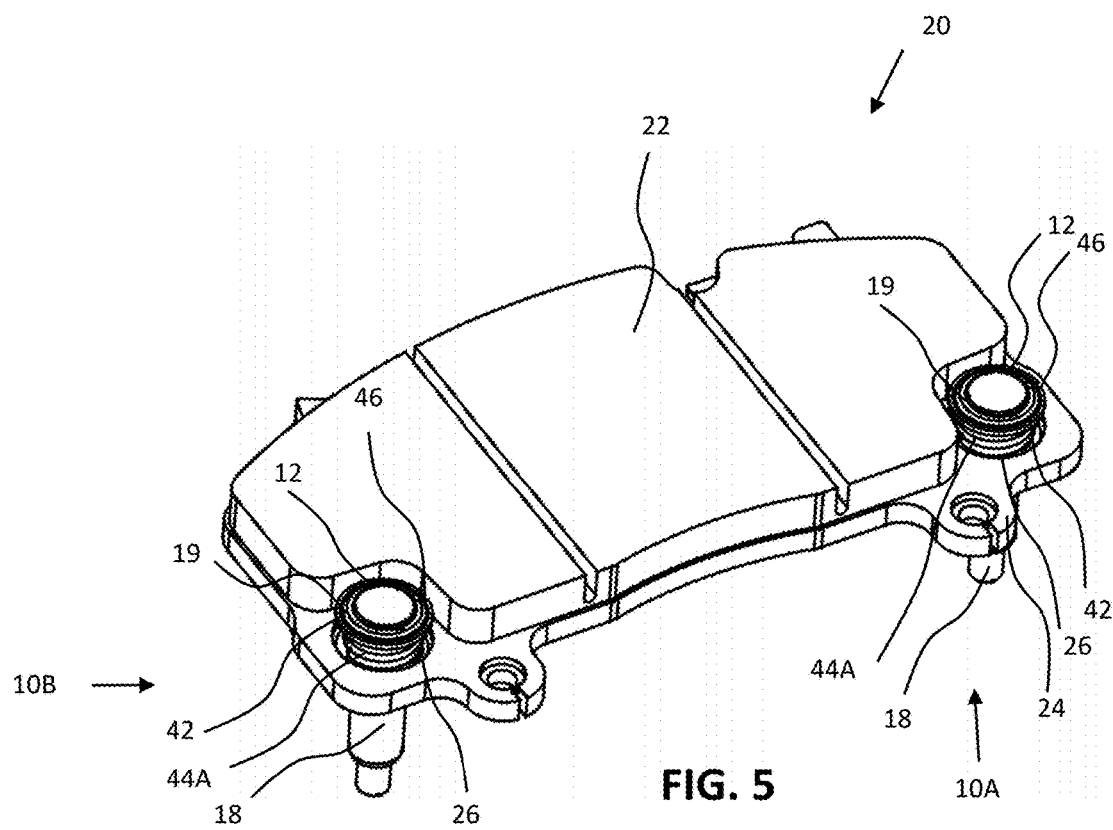
FIG. 5 is a perspective view of a brake pad including retraction devices.

FIG. 5 illustrates a perspective view of a brake pad 20. A retraction device 40 is inserted over a taper 12 of each pin 10. The retraction device 40 includes a bias device 44 that is a spring 44A having a step 19 and a lock 42. The lock 42 further includes a lock adjuster 46 to adjust an opening of the lock 42.

Figure 7:
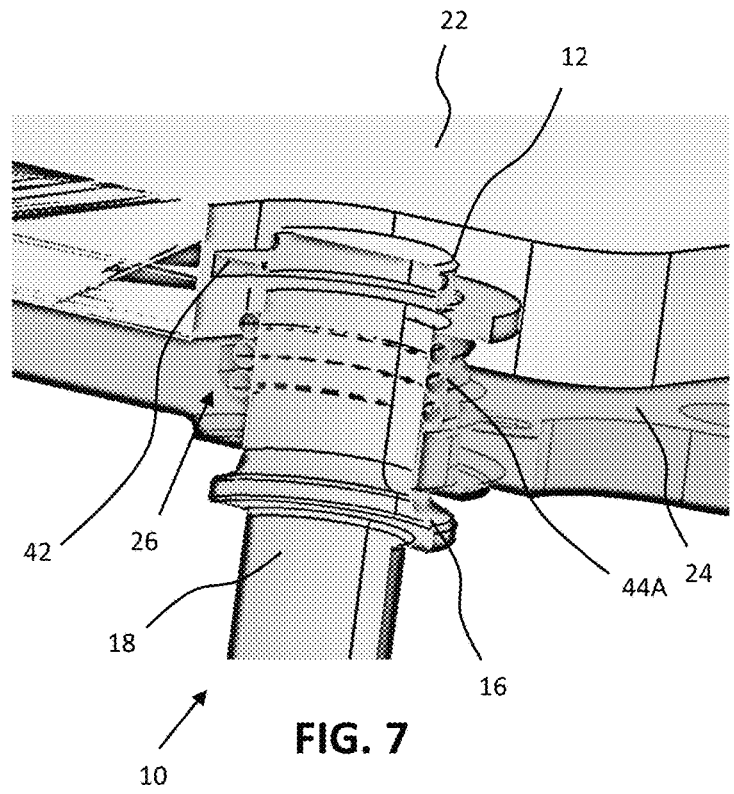
FIG. 7 is cross-section B-B of the pin and retraction device of FIG. 6.

FIGS. 6 and 7 illustrate a brake pad 20. The brake pad 20 includes a friction material 22 disposed on a surface of a pressure plate 24. An attachment piece 18 of a pin 10 is inserted into an aperture 26 located on the pressure plate 24. A retraction device 40 is inserted over a taper 12 of the pin 10. As shown in FIG. 7 (cross section B-B of FIG. 6), the retraction device 40 includes a bias device 44 that is a spring 44A having a step 19 and a lock 42. The lock 42 further includes a lock adjuster 46 to adjust an opening of the lock 42, the position of the lock 42, or to assist in connecting the lock 42 to the pin 10. The lock is retained in position relative to the spring 44A, the pin 10, or both by a retention feature 48. The retraction device 40 is located entirely on a same side of the pressure plate 24 as the friction material 22.

Figure 8:
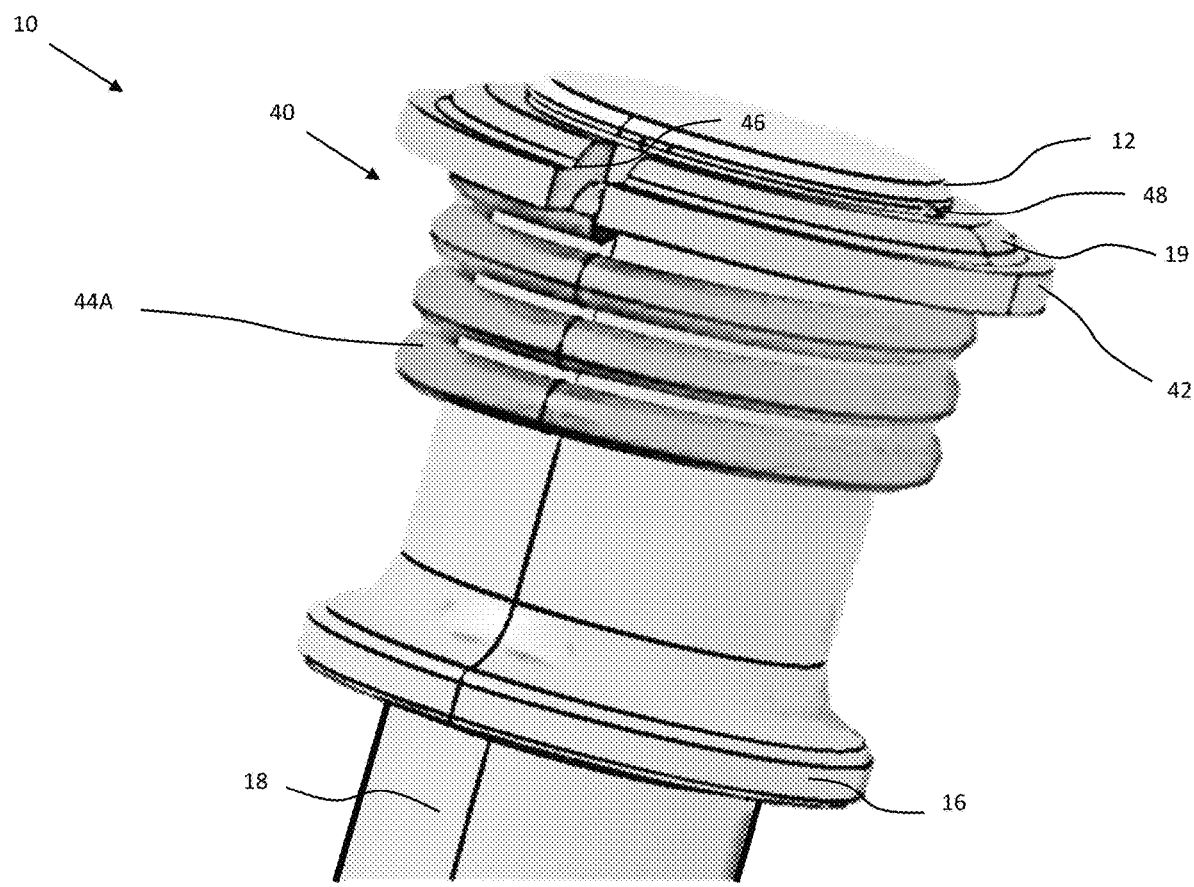
FIG. 8 is a close-up view of a pin and retraction device of a brake assembly.

FIG. 8 illustrates a pin 10 and retraction device 40 of a brake assembly (not shown). The pin 10 includes an attachment piece 18 abutting a boss 16, the attachment piece 18 configured to be inserted into an aperture of the brake assembly. A retraction device 40 is inserted over a taper 12 of the pin 10. The retraction device 40 includes a bias device 44 that is a spring 44A having a step 19 and a lock 42. The lock 42 further includes a lock adjuster 46 to adjust an opening of the lock 42, the position of the lock 42, or to assist in connecting the lock 42 to the pin 10. The lock is retained in position relative to the spring 44A, the pin 10, or both by a retention feature 48.

Figure 9:
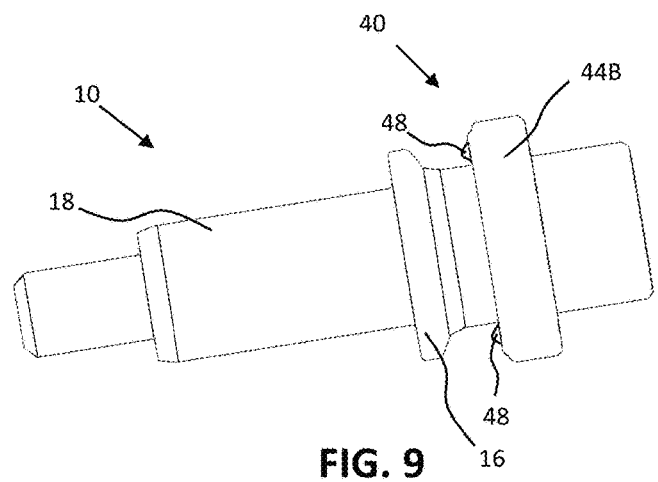
FIG. 9 is a perspective view of a pin and retraction device of a brake assembly.

FIG. 9 illustrates a perspective view of a pin 10 and a retraction device 40 of a brake assembly (not shown). The pin 10 includes an attachment piece 18 abutting a boss 16, the attachment piece 18 configured to be inserted into an aperture of the brake assembly. A retraction device 40 is inserted over the pin 10. The retraction device 40 includes a bias device 44 that is a grommet 44B having a plurality of retention features 48 to engage a pressure plate of the brake assembly (not shown) and retain a position of the retraction device 40 relative to the pin 10, one or more additional components of the brake assembly, or both.

Figure 10:
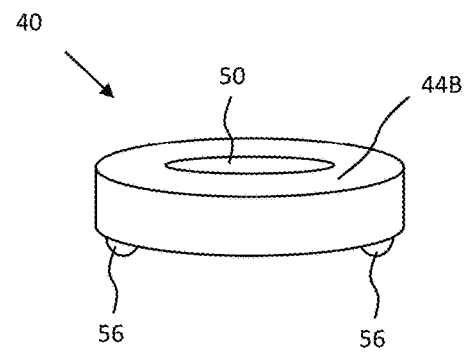
FIG. 10 is a perspective view of a retraction device of a brake assembly.

FIG. 10 illustrates a perspective view of a retraction device 40 of a brake assembly (not shown). The retraction device 40 is a grommet 44B including a plurality of anti-rotation features 56 to engage a pressure plate of the brake assembly (not shown). A pin (not shown) is inserted through an opening 50 of the grommet 44B so that, when a brake pad is extended in an engaging direction during a clamping operation of the brake assembly, the grommet 44B may aid in retracting the brake pad back to an original position during release of the clamping operation.

Figure 11:
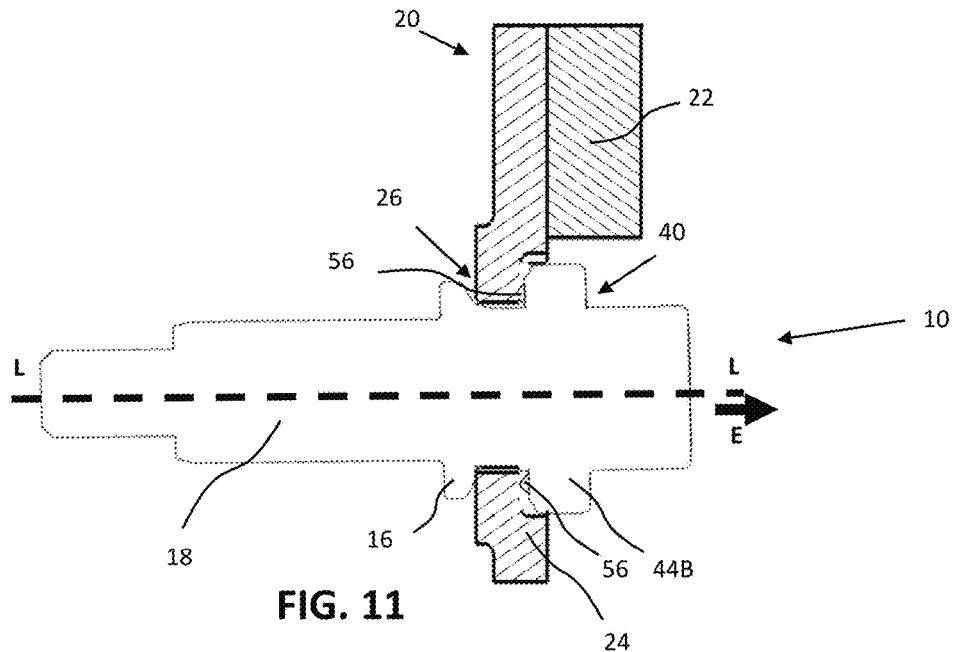
FIG. 11 is a cross-section of a retraction device of a brake assembly.

FIG. 11 illustrates a cross-section of a brake pad 20. The brake pad 20 includes a friction material 22 disposed on a surface of a pressure plate 24. An attachment piece 18 of a pin 10 is inserted into an aperture 26 of the pressure plate 24 so that a retraction device 40 of the pin 10 abuts a surface of the pressure plate 24 and a boss 16 of the pin 10 is positioned near an opposing surface of the pressure plate 24. The retraction device 40 is inserted over the attachment piece 18 of the pin 10. The retraction device 40 includes a bias device 44 that is a grommet 44B having a plurality of anti-rotation features 56 that retains the grommet 44B in a position relative to the pin 10, the pressure plate 24, or both. The retraction device 40 is configured to bias the brake pad 20 in a position along a longitudinal axis (L) of the pin 10 when the brake pad 20 is disengaged from a surface of a rotor (not shown). When the brake pad 20 engages the rotor, the brake pad 20 is moved in an engaging direction (E), compressing the grommet 44B.

Figure 12:
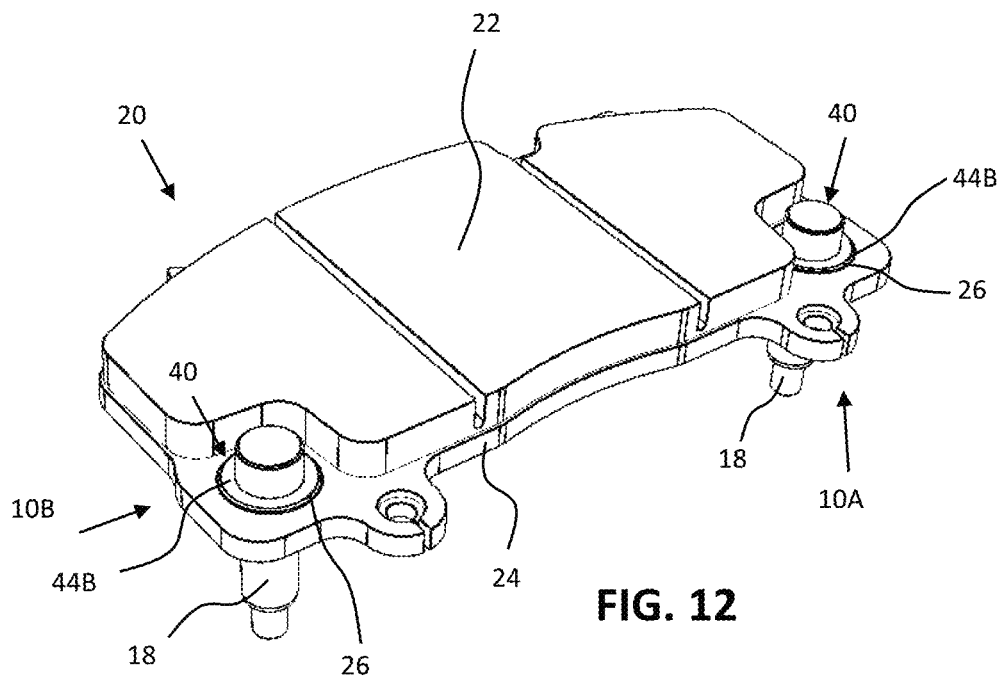
FIG. 12 is a perspective view of a brake pad including retraction devices.

FIG. 12 illustrates a perspective view of a brake pad 20. The brake pad 20 includes a friction material 22 disposed on a surface of a pressure plate 24. An attachment piece 18 of a pin 10 at a leading end 10A and a trailing end 10B are inserted into a plurality of apertures 26 located on the pressure plate 24. A retraction device 40 is inserted over the attachment piece 18 of the pin 10 and abuts a surface of the pressure plate 24. The retraction device 40 includes a bias device 44 that is a grommet 44B having a plurality of retention features that retains the grommet 44B in a position relative to the pin 10, the pressure plate 24, or both.

Figure 13:
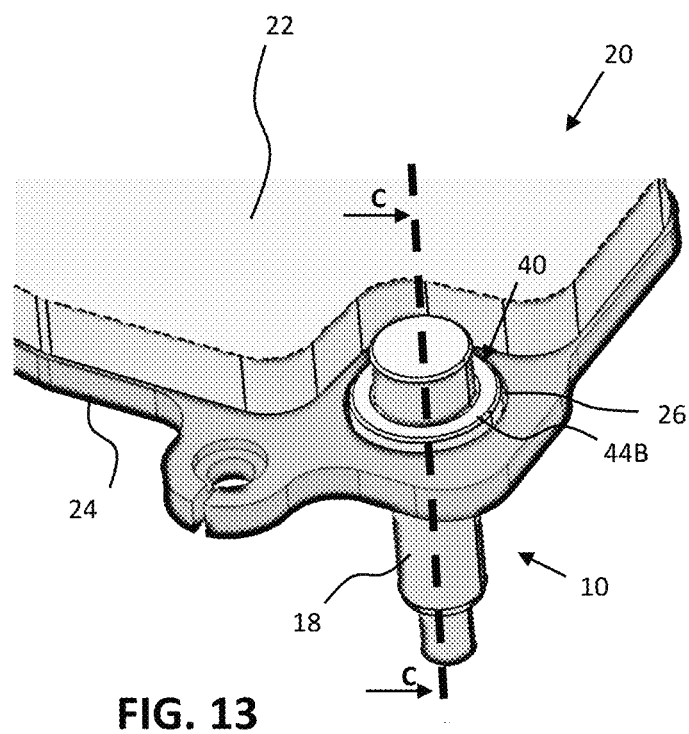
FIG. 13 is a close-up view of a retraction device and pin located within an aperture of a brake pad.

FIGS. 13 and 14 illustrate a brake pad 20. The brake pad 20 includes a friction material 22 disposed on a surface of a pressure plate 24. An attachment piece 18 of a pin 10 is inserted into an aperture 26 located on the pressure plate 24 so that a boss 16 of the pin 10 is positioned near a surface of the pressure plate 24 opposing the friction material 22. A retraction device 40 is inserted over the attachment piece 18 of the pin 10. As shown in FIG. 14 (cross-section C-C of FIG. 13), the retraction device 40 includes a bias device 44 that is a grommet 44B. The grommet 44B is retained in position relative to the pin 10, the pressure plate 24, or both by a plurality of retention features of the grommet 44B abutting the pressure plate 24 (see FIG. 11). The retraction device 40 is located entirely on a same side of the pressure plate 24 as the friction material 22.

FIG. 15A illustrates a perspective view of a retraction device 40 of a brake assembly (not shown). The retraction device 40 includes a bias device 44 that is a bushing 44C having a plurality of mounting points 52 to engage bushing mounts of a pressure plate of the brake assembly (see FIGS. 16 and 17). A pin (not shown) is inserted through an opening 50 of the bushing 44C so that, when a brake pad is extended in an engaging direction during a clamping operation of the brake assembly, the bushing 44C may aid in retracting the brake pad back to an original position during release of the clamping operation.

FIG. 15B illustrates a perspective view of a retraction device 40 of a brake assembly (not shown). The retraction device 40 includes a bias device 44 that is a bushing 44C having a plurality of mounting points 52 to engage bushing mounts of a pressure plate of the brake assembly (see FIGS. 16 and 17). A pin (not shown) is inserted through an opening 50 of the bushing 44C so that, when a brake pad is extended in an engaging direction during a clamping operation of the brake assembly, the bushing 44C may aid in retracting the brake pad back to an original position during release of the clamping operation.

FIG. 15C illustrates a perspective view of a retraction device 40 of a brake assembly (not shown). The retraction device 40 includes a bias device 44 that is a bushing 44C having a plurality of mounting points 52 to engage bushing mounts of a pressure plate of the brake assembly (see FIGS. 16 and 17). A pin (not shown) is inserted through an opening 50 of the bushing 44C so that, when a brake pad is extended in an engaging direction during a clamping operation of the brake assembly, the bushing 44C may aid in retracting the brake pad back to an original position during release of the clamping operation.

Figure 16:
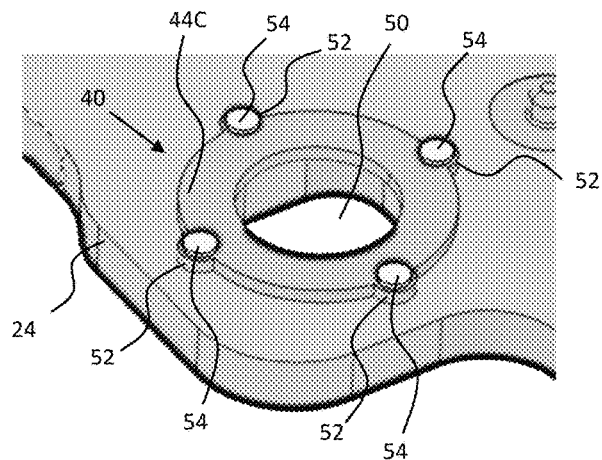
FIG. 16 is a close-up view of a retraction device secured to a pressure plate of a brake pad.

FIG. 16 illustrates a perspective view of a retraction device 40 engaging a pressure plate 24 of a brake pad. The retraction device 40 includes a bias device 40 that is a bushing 44C having a plurality of mounting points 52 engaging a plurality of bushing mounts 54 of the pressure plate 24. A pin (not shown) is inserted through an opening 50 of the bushing 44C so that, when the pin is extended in an engaging direction during a clamping operation of the brake assembly, the bushing 44C may aid in retracting the pin back to an original position during release of the clamping operation.

Figure 17:
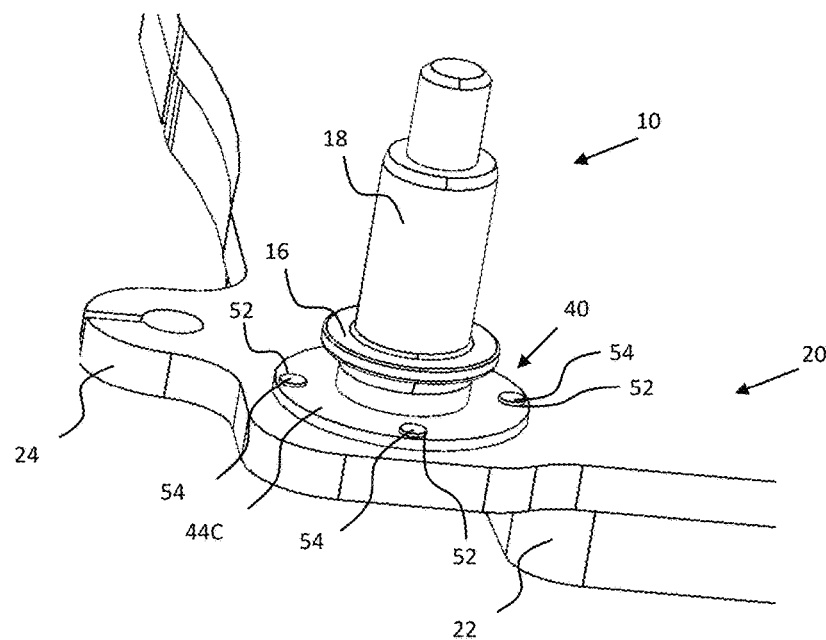
FIG. 17 is a close-up view of a pin and retraction device, having the pin located within an aperture of a brake pad.

FIG. 17 illustrates a close-up perspective view of a brake pad 20. The brake pad 20 includes a friction material 22 disposed on a surface of a pressure plate 24. An attachment piece 18 abutting a boss 16 of a pin 10 is inserted into an aperture of the pressure plate 24. A retraction device 40 is inserted over the attachment piece 18 of the pin 10. The retraction device 40 includes a bias device 44 that is a bushing 44C. The bushing 44C is retained in position relative to the pin 10, the pressure plate 24, or both by a plurality of mounting points 52 of the bushing 44C engaged to a plurality of bushing mounts 54 of the pressure plate 24. The retraction device 40 is located entirely on an opposing side of the pressure plate 24 as the friction material 22.

Figure 18A:
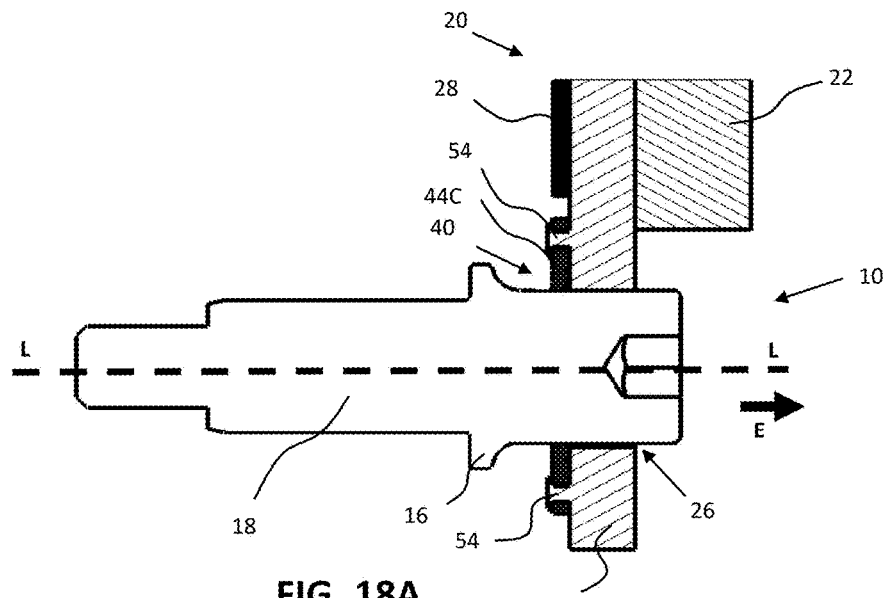
FIG. 18A is a cross-section of a retraction device of a brake assembly in a released position.
Figure 18B:
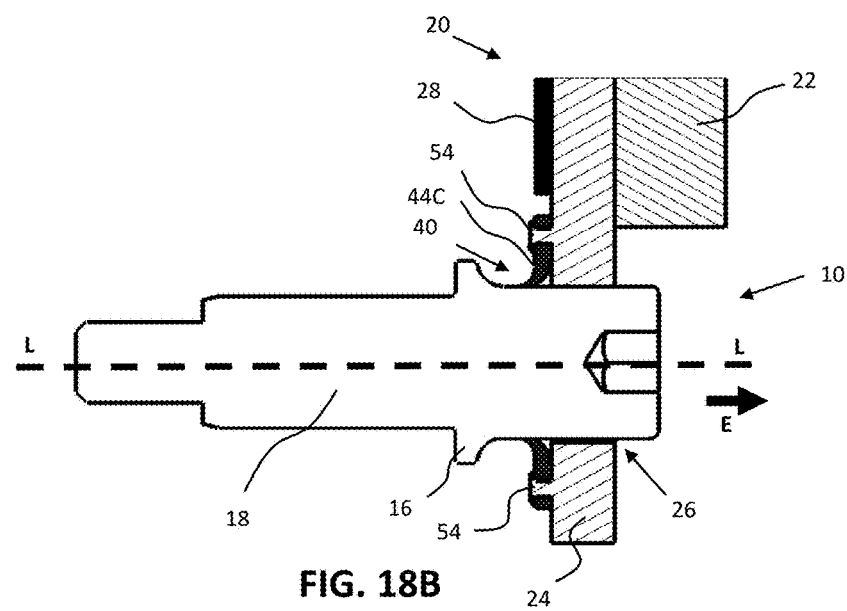
FIG. 18B is a cross-section of a retraction device of a brake assembly in an engaged position.

FIGS. 18A and 18B illustrate cross-sections of brake pad 20. The brake pad 20 includes a friction material 22 disposed on a surface of a pressure plate 24, the pressure plate 24 having a shim 28 positioned on an opposing surface relative to the friction material 22. An attachment piece 18 abutting a boss 16 of a pin 10 is inserted into an aperture 26 of the pressure plate 24 so that a retraction device 40 of the pin 10 abuts a surface of the pressure plate 24. The retraction device 40 is inserted over the attachment piece 18 of the pin 10. The retraction device 40 includes a bias device 44 that is a bushing 44C. The bushing 44C is retained in position relative to the pin 10, the pressure plate 24, or both by a plurality of mounting points of the bushing 44C engaged to a plurality of bushing mounts 54 of the pressure plate 24. As shown in FIG. 18A, the retraction device 40 is configured to bias the brake pad 20 in a position along a longitudinal axis (L) of the pin 10 when the brake pad 20 is disengaged from a surface of a rotor. As shown in FIG. 18B, when the brake pad 20 engages the rotor, the brake pad 20 is moved in an engaging direction (E), flexing the bushing 44C and creating a retraction force on the brake pad 20 in a direction substantially opposing the engaging direction (E) (i.e., a retraction direction).

Any numerical values recited herein include all values from the lower value to the upper value in increments of one unit provided that there is a separation of at least 2 units between any lower value and any higher value. As an example, if it is stated that the amount of a component or a value of a process variable such as, for example, temperature, pressure, time and the like is, for example, from 1 to 90, preferably from 20 to 80, more preferably from 30 to 70, it is intended that values such as 15 to 85, 22 to 68, 43 to 51, 30 to 32 etc. are expressly enumerated in this specification. For values which are less than one, one unit is considered to be 0.0001, 0.001, 0.01 or 0.1 as appropriate. These are only examples of what is specifically intended and all possible combinations of numerical values between the lowest value and the highest value enumerated are to be considered to be expressly stated in this application in a similar manner. The use of the terms "comprising" or "including" to describe combinations of elements, ingredients, components or steps herein also contemplates embodiments that consist essentially of the elements, ingredients, components or steps. By use of the term "may" herein, it is intended that any described attributes that "may" be included are optional.

Plural elements, ingredients, components or steps can be provided by a single integrated element, ingredient, component or step. Alternatively, a single integrated element, ingredient, component or step might be divided into separate plural elements, ingredients, components or steps. The disclosure of "a" or "one" to describe an element, ingredient, component or step is not intended to foreclose additional elements, ingredients, components or steps.

2 Brake Assembly
4 Caliper
6 Direction of Rotation
10 Pin
10A Leading End
10B Trailing End
12 Taper
14 Nut
16 Boss
18 Attachment Piece
19 Step
20 Brake Pad
22 Friction Material
24 Pressure Plate
26 Aperture
28 Shim
40 Retraction Device
42 Lock
44 Bias Device
44A Spring
44B Grommet
44C Bushing
46 Lock Adjuster
48 Retention Feature
50 Opening
52 Mounting Point
54 Bushing Mount
56 Anti-rotation features
L Pin Longitudinal Axis
E Engaging Direction

We claim:

1. A brake assembly comprising:
 a. a caliper;
 b. a brake pad;
 c. a pin connecting the brake pad to the caliper;
 d. a retraction device connected to the pin, the retraction devices including:
  i. an abutment; and
  ii. a bias device located between the abutment and the brake pad;
 wherein the abutment retains the bias device on the pin, and
 wherein during a brake apply, the brake pad is moved towards the retraction device compressing the bias device between the abutment and the brake pad, and upon release of the brake apply the retraction device applies a retraction force on to the brake pad.

2. The brake assembly of claim 1, wherein the bias device is entirely located on a first side of the brake pad.

3. The brake assembly of claim 1, wherein the bias device is a spring.

4. The brake assembly of claim 1, wherein the bias device is a grommet or a bushing.

5. The brake assembly of claim 1, wherein the bias device is free of any loops or arms that extend from a first side of the brake pad to a second side of the brake pad.

6. The brake assembly of claim 1, wherein the bias device axially moves the brake pad along an axis of the bias device, the pin, or both.

7. The brake assembly of claim 1, wherein the bias device and the pin are co-axial.

8. The brake assembly of claim 1, wherein the bias device is a conical spring.

9. The brake assembly of claim 1, wherein the abutment is press fit onto the pin.

10. The brake assembly of claim 9, wherein the pin includes a retention feature that retains the abutment on the pin.

11. The brake assembly of claim 9, wherein the abutment includes one or more steps.

12. The brake assembly of claim 9, wherein the abutment is a lock that includes a lock adjuster that allows the lock to be adjusted after being press fit onto the pin.

13. The brake assembly of claim 1, wherein the retraction device is located in a leading end, a trailing end, or both of the brake assembly.

14. The brake assembly according to claim 1, wherein the brake pad comprises a friction material and a pressure plate, the bias device is located on a same side of the pressure plate as the friction material.

15. A brake assembly comprising:
 a brake caliper;
 a brake pad having a pressure plate and a friction material;
 a pin having a first section that engages the brake caliper, and a second section that engages the brake pad; and
 a bias device engaging the pin and a surface of the pressure plate that opposes the fiction material;
 wherein the bias device biases the brake pad in a direction away from a brake rotor during release of a brake apply.

16. The brake assembly according to claim 15, wherein the bias device is a spring.

17. The brake assembly according to claim 15, wherein the bias device is a bushing or grommet.

18. The brake assembly according to claim 17, wherein the bias device comprises one or more mounts that engage one or more mounts on the pressure plate.

19. The brake assembly according to claim 15, wherein the first section of the pin engages an aperture defined in the brake caliper, and the second section of the pin engages an aperture in the brake pad.

20. The brake assembly of claim 15, wherein the bias device and the pin are co-axial.

* * * * *